United States Patent Office 2,695,227
Patented Nov. 23, 1954

2,695,227

INDIUM PURIFICATION USING PROTEINACEOUS MATERIALS

Yurii E. Lebedeff, Metuchen, N. J., assignor to American Smelting and Refining Company, New York, N. Y., a corporation of New Jersey No Drawing. Application January 31, 1952, Serial No. 269,335

2 Claims. (Cl. 75—108)

This invention relates to a process for separating from indium, metals which are difficultly separable therefrom by pyrometallurgical processes. More particularly, it relates to a process in which such contaminates are removed from an impure indium solution by adding thereto an organic material.

Heretofore, pyrometallurgical processes (so-called kettle processes) have been used to separate, from indium and indium-bearing materials, metals and metal values that are undesirably present therein. Such processes are effective for the separation of "kettle-removable" metals which include all of the metals above indium in the electromotive series of metals, and some of the metals below indium in this series.

Pyrometallurgical processes, however, are generally ineffective for the removal of other of the metals below indium in the electromotive series. Such metals are lead, tin, bismuth and silver and are referred to herein as metals difficultly removable from indium by pyrometallurgical processes or difficultly removable or separable metals. Silver and bismuth can be removed from indium only with great difficulty by such processes and these processes are ineffective, for all practical purposes, for the removal of lead and tin. Consequently, indium, free of or having a desirably low content of the difficultly removable metals, could not be produced commercially, heretofore, from indium-bearing materials containing these metals.

The principal object and advantage of the invention is to provide a simple, practical and economical process for the separation from indium of metals removable therefrom with difficulty by pyrometallurgical processes. Another object is to provide a process for separating such metals, especially lead or tin or both, from indium when they are present therein in small quantities. Other objects and advantages will be apparent to those skilled in the art from the following detailed description of the invention.

The invention is based on the discovery that organic compounds, especially proteinaceous materials, when added to an impure indium solution having dissolved therein a difficultly separable metal or metals, form an insoluble compound or compounds with such metals. Broadly, the invention comprehends a process for purifying an indium solution having a difficultly removable metal dissolved therein by adding to the solution an organic compound, preferably a proteinaceous material and separating the resulting insoluble compound or compounds that are formed from the solution.

Preferably, the solution is agitated after the addition of the organic material for a time sufficient to insure efficient precipitation of the contaminating metal. Good results are obtained with agitation for periods of about one-half to five hours although a longer period may be used. Preferably also during the formation of the insoluble compound or compounds and their separation, the solution is maintained in the range of about 20–80° C., although temperatures above and below this range may also be used.

Although an indium solution containing any amount of difficultly separable metal may be purified by the process, it is particularly effective for indium solutions containing a minor amount of these metals, such as solutions containing less than 2 grams per liter, and especially solutions containing less than 1 gram per liter and preferably less than .5 gram per liter in the aggregate.

The amount of organic material added to the impure indium solution depends upon the aggregate amount of difficultly separable metal present. In general, best results are obtained by adding such material in amounts of about 10–20 times the aggregate amount of the difficultly removable metal, but not less than 1 gram per liter of organic material. For most solutions that are encountered, good results are obtained by adding from 2 to 5 grams per liter of this material.

Preferably, the solution is an aqueous acid solution having an acidity of about 1–10 grams of acid per liter. Any suitable acid, such as sulphuric acid, hydrochloric acid, acetic acid and the like may be used to establish the solution and the excess acidity therein. Any organic material may be used in the process; however, proteinaceous material such as glue and casein are the preferred materials for removing the difficultly separable metal.

The indium remaining in the solution after the separation of the precipitate containing the difficultly separable metal may be recovered in any suitable manner such as, for example, by electrolyzing the solution to deposit the indium therein on a cathode. In the most preferred process, the indium is recovered from the solution by galvanic precipitation. In accordance with this, a galvanic precipitant higher than indium, and preferably higher than chromium, in the electromotive series of metals is added to the solution in sufficient quantities to precipitate the indium therein as metallic indium. The thus precipitated indium is then separated and recovered from the solution. Thereafter, the recovered indium may be kettle processed, if desired, to separate kettle-removable metals that may be present, including the galvanic precipitant.

Aluminum, zinc, magnesium and manganese are the preferred metals for galvanically precipitating the indium from the purified solution. Of these metals, aluminum is the most preferred, both because the cost per pound of precipitated metal is lowest when it is used and also because low cost commercial aluminum is available which is free of difficultly separable metal.

When aluminum is used as the galvanic precipitant, it is desirable that the solution have, or be adjusted to have, a chloride content of about 30–90 grams per liter of chlorine as chloride. Although greater or lesser amounts or no chloride need be present when aluminum is used, the presence of the amounts indicated insures the formation of a coalescent metallic precipitate which is easily separated from the solution.

The galvanic precipitant used to recover the indium from the purified solution should be a metal that is free of difficultly separable metal or metals, as any such metal introduced into the solution with the precipitant will contaminate the recovered indium. For purposes of recovering the indium, the galvanic metal may be considered to be free of the contaminating metal or metals when its content of such metal or metals is insufficient to contaminate the recovered indium beyond acceptable limits. For example, if indium of 99.9% purity is to be produced, aluminum containing not in excess of about 0.15% by weight in the aggregate of difficultly separable metals may be used. Correspondingly, zinc containing not in excess of 0.05% and magnesium containing not in excess of 0.10% in the aggregate of the difficultly removable metals may also be used. Galvanic precipitants containing lower amounts of these metals are preferred in general and are used particularly where a final indium product of higher purity is desired.

The invention is further illustrated in the following specific examples. It should be understood, however, that the examples are given for purposes of illustration and that the invention in its broadest aspects is not limited thereto.

*Example I*

1000 cc. of an indium solution having the following analyses was prepared:

In = 50 gms./l.
Cl⁻ = 90 gms./l.
$H_2SO_4$ = 6 gms./l.
Pb = 0.045 gms./l.
Sn = 0.080 gms./l.

The solution was heated to 45–50° C., after which 14 grams of aluminum powder substantially free of difficultly separable metals was added and the mixture was stirred for one hour to coalesce the spongy precipitate that was formed. The mixture was then filtered and the filtrate was found to contain 0.1 gram per liter of indium. The wet metallic sponge-precipitate separated by the filtration was fused with a caustic solution containing 35 grams of sodium hydroxide and 35 cc. water. The caustic residue was then treated at room temperature with additional water to remove the aluminum and caustic content of the product. The supernatant solution was separated by decantation and was found to contain 1 gram of indium. 49 grams of indium metal remained after the caustic treatment and had an analysis as follows:

$In = 98\%$
$Pb = 0.1\%$
$Sn = 0.16\%$

It will be noted that essentially all of the lead and tin in the original solution is contained in the metallic indium sponge product.

*Example II*

1000 cc. of an indium solution having the analyses set forth in Example I was prepared. The temperature of the solution was adjusted to 60° C. and to it was added 2 grams of glue. The solution was then stirred for five hours and filtered while maintaining the temperature. Thereafter the indium in the filtrate was precipitated with aluminum and recovered in the manner described in Example I. The indium product was analyzed for its indium, tin and lead content and the analysis showed that 82.4% of the lead and 71.3% of the tin had been removed from the original solution by the glue.

*Example III*

1000 cc. of an indium solution having the following analyses was prepared:

$In = 50$ gms./l. as sulphate
$Cl^- = 90$ gms./l. as sodium chloride
$H_2SO_4 = 6$ gms./l.
$Bi = 0.1$ gms./l.

2 grams of glue were added to the solution which was then stirred for one-half hour and filtered while maintaining a solution temperature of 60° C. Thereafter, the indium in the filtrate was precipitated with aluminum and recovered in the manner described in Example I. The indium product was analyzed for indium and bismuth and the analysis showed that 91.5% of the bismuth had been removed from the original solution by the glue.

*Example IV*

Example III was repeated except that 2 grams of casein were used in place of the 2 grams of glue. The analysis of the indium product showed that 84.5% of the bismuth was removed by the casein.

*Example V*

1000 cc. of an indium solution having the following analyses was prepared:

$In = 50$ gms./l. as sulphate
$Ag = 0.1$ gms./l. as sulphate
$H_2SO_4 = 10$ gms./l.

2 grams of glue were added to the solution which was then stirred for one-half hour and filtered all while maintaining the solution at a temperature of 60° C. The indium in the filtrate then was precipitated with aluminum and recovered in the manner set forth in Example I. Analysis of the indium product for its indium and silver content showed that 100% of the silver had been removed from the original solution by the treatment with the glue.

The impure indium solution upon which the process of the invention is practiced may be prepared in any suitable manner from any suitable starting material. For example, an aqueous indium-bearing solution may be obtained by hydrometallurgical treatment of an indium-bearing zinc calcine or zinc oxide. It may also be obtained by acid leaching the slag resulting from the pyrometallurgical refining of a lead alloy containing indium. The method of the present invention, however, is equally applicable to the treatment of other indium-bearing solutions otherwise obtained.

As stated previously, the invention may be practiced with any indium-bearing solution containing any amount of difficultly separable metal dissolved therein. In general, it is desirable that the total concentration of these impurities be less than the concentration of the indium. Generally, a solution is preferred which contains 10 to 100 grams per liter of dissolved indium and a total concentration in the aggregate of difficultly separable metal not in excess of about 2 grams per liter. An indium product containing in the aggregate less than 0.1% of difficultly removable metal and as little as less than .01% of each of these metals may be readily recovered from the process.

The present invention may be embodied in other specific forms without departing from the spirit or essential attributes thereof and it is therefore desired that the present embodiments be considered in all respects as illustrative and not restrictive, reference being had to the appended claims rather than to the foregoing description to indicate the scope of the invention.

What is claimed is:

1. A process for treating an impure mineral acid solution of indium having dissolved therein about 10–100 grams per liter of indium and less than 0.5 grams per liter in the aggregate of metal which is difficultly separable from indium by pyrometallurgical processes, which consists of adding to the solution from 1–5 grams per liter of a proteinaceous material, forming in the solution insoluble compounds of said difficultly separable metal consisting of said proteinaceous material and said difficultly separable metal, and separating the resulting insoluble matter from the solution, thereby removing said difficultly separable metal from said indium solution.

2. A process according to claim 1 in which said proteinaceous material is glue.

References Cited in the file of this patent

UNITED STATES PATENTS

| Number | Name | Date |
|---|---|---|
| 1,065,678 | French | June 24, 1913 |
| 2,271,970 | Doran et al. | Feb. 3, 1942 |

FOREIGN PATENTS

| Number | Country | Date |
|---|---|---|
| 1,563 | Great Britain | 1877 |